Oct. 3, 1939.    C. K. SHEDD ET AL    2,175,035
CHECK ROW PLANTER
Filed May 28, 1937
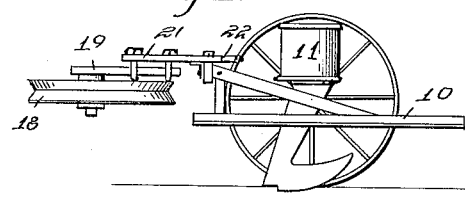
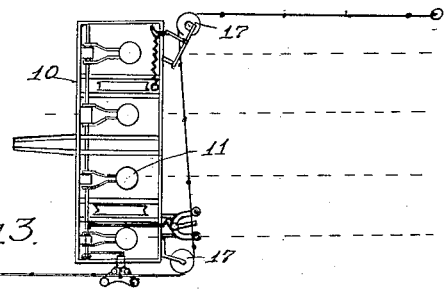
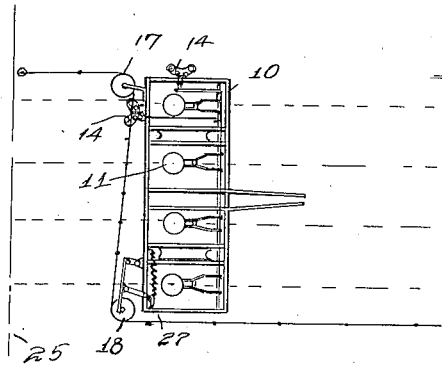
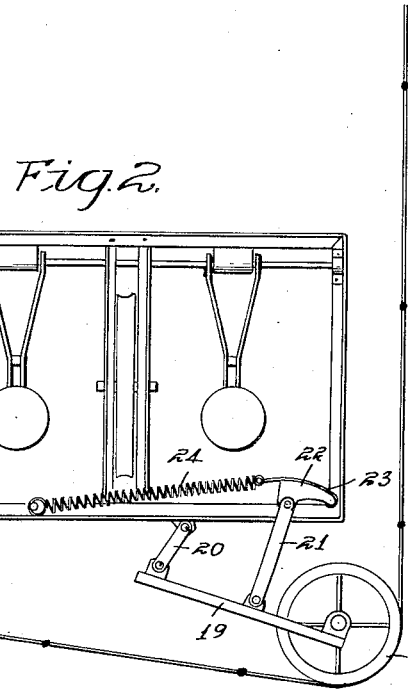

Patented Oct. 3, 1939

2,175,035

UNITED STATES PATENT OFFICE 2,175,035

CHECK ROW PLANTER

Claude K. Shedd and Edgar V. Collins, Ames, Iowa, assignors, by mesne assignments, to Iowa State College Research Foundation, Ames, Iowa, a corporation of Iowa Application May 28, 1937, Serial No. 145,290

4 Claims. (Cl. 111—45)

The object of our invention is to provide an improved check row planter, whereby a guide line may be established at one end of a field and one end of a check wire fixed in position at said guide line, and whereby all of the tripping operations of the seed dropping mechanism will be actuated by the buttons on that portion of the check wire which extends from said guide line to the planter and which is tightly stretched and in position parallel with the line of advance of the planter, both on the trip from the guide line and back toward the guide line, to thereby avoid such variation and errors in accurate check row planting as are occasioned in the methods now in use due to the necessary transverse movement of the check wire during the advance of the planter and due to the inability of the operator to accurately remove and replace the check wire stakes at both ends of the field along exactly parallel lines.

A further object is to provide means of simple, durable and inexpensive construction for moving a check wire transversely of the planter during the advance of the planter, and to apply a uniform yielding tension to the check wire.

In the accompanying drawing—

Figure 1 shows a side elevation of a planter having our improved check wire tensioning device applied thereto.

Figure 2 shows a top or plan view of the same with the check wire extended around the tensioning device and through the seed dropping trip device; and Figure 3 is a diagram illustrating a check wire extended across the field from the straight guide line established at the left side of the field and illustrating the position of the various parts of the planter relative to the check wire, both when the planter is advancing to the right, as shown in the figure, and also to the left.

Referring to the accompanying drawing we have used the reference numeral 10 to indicate generally the check row seed planter of ordinary construction and having a series of seed containers 11 provided with the usual seed dropping valves, not shown, but which are actuated from a shaft 12 extended across the planter and operatively connected with the seed dropping mechanism by the arm 13.

The tripping mechanism is of ordinary construction and indicated generally by the reference numeral 14 and is connected with the shaft 12 by the rod 15. For convenience we preferably employ two of these tripping devices, one at one side of the planter and the other at the rear of the planter adjacent the same side. Both are connected to the shaft 12 in the same manner. The check wire is indicated by the numeral 16 and is of ordinary construction.

To the rear of the planter frame we have attached a pulley 17 to guide the check wire, and at the opposite side on the planter frame is a second check wire guide pulley 18. This pulley 18 is mounted for rotation upon an arm 19, which arm is connected to the planter frame by means of a link 20 and a lever 21, both pivoted to the arm 19 and to the planter frame. Fixed to one end of the lever 21 is an eccentric 22 and a cable 23 is attached to the eccentric and to a coil spring 24. The other end of the coil spring is attached to the frame. The arrangement of these parts is such that when the pulley 18 moves from its position shown in Figure 2, toward the right, the eccentric 22 will be moved upwardly and toward the left, and when in that position the point of contact of the cable 23 with the eccentric is near the outer end of the eccentric furthest from the fulcrum of the lever, and when in that position the spring 24 will be contracted to some extent. However, due to the shape of the eccentric the leverage applied to the arm 19 will be increased. Hence, an approximately constant tension will be applied to the check wire regardless of the position of the pulley 18. By this means a substantially constant tension is applied to the check wire.

When the planter is moving away from the guide line the check wire is passed around in front of the pulley 17 through the trip device at the rear of the planter, and around the rear of the pulley 18, and when the planter is moving in the opposite direction toward the left, as shown in Figure 3, the check wire is passed, first, through the trip device at the side of the planter and then in the rear of the pulley 17 and then around in front of the pulley 18. During the advance of the planter the check wire moves through the trip devices and actuates the seed dropping valves, and the check wire is picked up and moved transversely of the planter and again laid down at the side of the planter, and at the end of the field the operator removes the stake which supports the check wire and places it in a new location for the return trip in the customary manner. When the machine is moving in one direction across a field, as shown in Figure 3 at the lower part of the figure, the check wire is passed through the trip device at the rear of the machine, and when moving in the opposite direction, as shown at the upper part of the figure, the check wire is passed through the trip device at the side of the machine, and, as clearly shown in Figure 2, these two trip devices are so positioned relative to the pulley 17 that the same button on a check wire having its end fixed to a stake, would actuate either trip device when at the same distance from the stake, regardless of which direction the machine was being moved.

The method of operating our improved seed planter is as follows: We first establish a straight guide line 25 along one side of the field to be planted. This is usually done by making a furrow in the ground. Then the stake at the guide line end of the check wire is firmly fixed in position at said guide line, and as the stake is repeatedly removed and replaced, it is always accurately positioned and firmly fixed at said guide line. The opposite end of the check wire is fixed to a stake at the opposite end of the field, and no great amount of accuracy is necessary in properly positioning it. As the planter advances across the field in a direction away from the guide line, it is advanced at right angles to the guide line and the portion of the check wire between the trip mechanism of the planter and the guide line is laid in a straight line parallel with the rows being planted, and is tightly stretched. During the advance of the planter the check wire is picked up and moved transversely across the planter and relaid at the opposite side of the planter, and at a point between the tripping mechanism and the point where the check wire is picked up, we apply the necessary yielding tension to the check wire for the purpose of maintaining it tightly stretched between the tripping mechanism and the guide line end. When the end of the field is reached the check wire stake is withdrawn and moved to its new location about two planter widths from its original position, then the operator replaces the wire upon the planter, passing it around the rear of the pulley 17 and around the front of the pulley 18. The stake is then replaced in the ground. It is not necessary for the operator to use any great care in locating this stake other than to stretch the wire to approximately its proper tension before placing the stake, and when the wire is in this position and the planter started on its return trip, obviously the portion of the wire between the planter and the guide line end of the field will be straight and parallel with the previously planted row, then as the planter proceeds on said return trip the check wire is picked up after it has passed through the trip device and then moved transversely of the planter frame and relaid upon the ground and yielding tension is applied to it to take up the slack after it has passed through the trip device and moved transversely, then when the planter reaches the guide line end of the field the check wire stake is withdrawn and moved to a distance of two planter widths along the guide line and accurately positioned and firmly fixed exactly at the guide line.

It will be seen that with our improved machine there will at all times be a portion of the check wire firmly fixed to the ground at the guide line end and lying upon the ground in a straight line parallel with the rows being planted, so that at all times any given button on the check wire between the planter and the guide line will be at the same distance across the field from the guide line, during the entire planting of the field and after repeated removal and replacements of the check wire stakes, and due to this fact a maximum of accuracy in proper check rowing is attained.

It is well known that errors and inaccuracies in check row planting are occasioned to a large extent due to the fact that the necessary lateral movements of the check wire relative to the planter during the advance of the planter across the field effect changes in the distance between a given button on the check wire and a straight guide line at one end of the field and, hence, if the tripping mechanism is actuated at any time during the movement of the planter either from or toward the guide line, by a portion of the check wire lying in other than a straight line parallel with the rows being planted, and at right angles to the check line, there would be a variation in the actuation of the tripping mechanism and an inaccuracy in check row planting.

Furthermore, it is well known that it is practically impossible for an operator to establish straight guide lines at opposite ends of the field in exact parallelism, and this accounts for a large percentage of errors and variations in check row planting. With our improved machine these causes of error and inaccurate check row planting are avoided, and an operator readily and quickly learns to practice the method and adjust the several parts of the planter and check wire necessary to obtain the desired results. Furthermore, less time and less skill on the part of the operator are required, and errors and variations in accurate check row planting are practically eliminated.

We claim as our invention:

1. A check row planter, comprising a frame to be advanced over a field, a series of seed boxes carried by the frame, a trip mechanism for the seed boxes, including two trip devices to be actuated by a check wire, one located at the rear of the frame and one at the side of the frame, a pulley attached to the frame, a check wire having buttons thereon, the positions of the trip devices relative to the pulley being such that a given button on a stationary check wire would engage and operate either trip device, if the check wire was passed around the rear of the pulley and through the trip device at the side of the frame, or around the front of the pulley and through the trip device at the rear of the frame, a second pulley for the check wire located at the rear of the frame at the side opposite from the first, and means for applying yielding tension to said second pulley, tending to take up slack in the check wire.

2. A check row planter, comprising a frame to be advanced over a field, a series of seed boxes carried by the frame, a trip mechanism for the seed boxes, including two trip devices to be actuated by a check wire, one located at the rear of the frame and one at the side of the frame, a pulley attached to the frame, a check wire having buttons thereon, the positions of the trip devices relative to the pulley being such that a given button on a stationary check wire would engage and operate either trip device, if the check wire was passed around the rear of the pulley and through the trip device at the side of the frame, or around the front of the pulley and through the trip device at the rear of the frame, a second pulley for the check wire located at the rear of the frame at the side opposite from the first, means for applying yielding tension to said second pulley, tending to take up slack in the check wire, a lever fulcrumed to the frame and having said pulley attached thereto, a cam fixed to the end of the lever opposite from the pulley, a flexible cable fixed to the cam, and a contractible spring attached to said cable and to the frame.

3. A check row planter, comprising a frame to be advanced over a field, a series of seed boxes carried by the frame, a trip mechanism for the seed boxes, including two trip devices to be actuated by a check wire, one located at the rear of the frame and one at the side of the frame, a pulley attached to the frame, a check wire having buttons thereon, the positions of the trip devices relative to the pulley being such that a given button on a stationary check wire would engage and operate either trip device, if the check wire was passed around the rear of the pulley and through the trip device at the side of the frame, or around the front of the pulley and through the trip device at the rear of the frame, a second pulley for the check wire located at the rear of the frame at the side opposite from the first, means for applying yielding tension to said second pulley, tending to take up slack in the check wire, an arm upon which said pulley is pivoted, a link for pivotally connecting said arm to the frame, a lever fulcrumed to the frame and pivoted to said arm, a cam fixed to the lever, a cable attached to the cam, and a contractible spring attached to the cable and the frame.

4. The combination with a check row planter and a check wire, of planter trip mechanism to be actuated by the check wire, means for guiding the check wire laterally across the planter as the planter is being advanced, and yielding means carried by the planter for taking up slack in the check wire, said parts being so positioned relative to the planter and to each other that as the planter advances in one direction, the trip mechanism will be between the slack take-up device and a fixed point at one end of a field being planted, and as the planter advances in the opposite direction, the trip mechanism will be between the slack take-up mechanism and the same fixed point.

CLAUDE K. SHEDD.
EDGAR V. COLLINS.